(12) United States Patent
Gochou et al.

(10) Patent No.: US 7,760,466 B2
(45) Date of Patent: Jul. 20, 2010

(54) THIN FILM MAGNETIC HEAD WITH A METAL LAMINATION PART HAVING CONCAVE CONNECTION SURFACE

(75) Inventors: Hideki Gochou, Niigata-ken (JP); Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 167 days.

(21) Appl. No.: 11/561,312

(22) Filed: Nov. 17, 2006

(65) Prior Publication Data

US 2007/0117373 A1 May 24, 2007

(30) Foreign Application Priority Data

Nov. 21, 2005 (JP) .............. 2005-335473

(51) Int. Cl.
*G11B 5/17* (2006.01)
(52) U.S. Cl. ................................. 360/123.15
(58) Field of Classification Search ............ 360/123.15, 360/123.17, 123.11
See application file for complete search history.

(56) References Cited

U.S. PATENT DOCUMENTS

| 6,596,468 | B1 | 7/2003 | Han et al. |
| 6,741,421 | B2 | 5/2004 | Mochizuki et al. |
| 7,221,250 | B2 * | 5/2007 | Yoshida et al. .............. 336/200 |
| 7,475,470 | B2 | 1/2009 | Mochizuki et al. |
| 2002/0054460 | A1 | 5/2002 | Takahashi et al. |
| 2004/0100728 | A1 | 5/2004 | Sato et al. |
| 2005/0195062 | A1 * | 9/2005 | Yoshida et al. .............. 336/200 |

FOREIGN PATENT DOCUMENTS

| JP | 07-225918 | 8/1995 |
| JP | 7225918 A | 8/1995 |
| JP | 2001-358105 | 12/2001 |
| JP | 2001358105 A | 12/2001 |
| JP | 2002-197612 | 7/2002 |
| JP | 2002197612 A | 7/2002 |
| JP | 2002-279606 | 9/2002 |
| JP | 2002279606 A | 9/2002 |
| JP | 2004-296062 | 10/2004 |

OTHER PUBLICATIONS

Office Acton issued in corresponding Japanese Patent Application No. 2005-335473; issued Oct. 28, 2008.

* cited by examiner

*Primary Examiner*—David D Davis
(74) *Attorney, Agent, or Firm*—Brinks Hofer Gilson & Lione

(57) ABSTRACT

A thin film magnetic head with a metal lamination part and method of manufacturing the same are provided. The thin film magnetic head including a metal lamination part in which an upper metal layer is laminated on a lower metal layer. The metal lamination part is formed in the laminated structure. An interlayer connection surface between the lower metal layer and the upper metal layer of the metal lamination part is formed in a concave shape that is curved toward the lower metal layer.

8 Claims, 6 Drawing Sheets

THIN FILM MAGNETIC HEAD WITH A METAL LAMINATION PART HAVING CONCAVE CONNECTION SURFACE

CROSS-REFERENCE TO RELATED APPLICATIONS

This application claims the benefit of Japanese Patent Application No. 2005-335473 filed Nov. 21, 2005, which is hereby incorporated by reference.

BACKGROUND

1. Field

The present embodiments relate to a thin film magnetic head with a metal lamination part.

2. Related Art

As commonly known, a recording element section of a thin film magnetic head includes a lower core layer and an upper core layer that are formed of a magnetic material. A coil layer induces a recording field for the core layers. A magnetic gap layer is interposed between the core layers. The recording element section records magnetic information onto the recording medium using a leakage magnetic field that is generated from the core layers on a surface facing a recording medium through the magnetic gap layer.

Recently, a solenoid-type coil has been wound around the core layers so as to effectively use three-dimensional spaces around the coil layers for the purpose of reducing the size of the recording element section. In the solenoid-type coil, lower coil layers formed below a core layer (for example, a lower core layer) need to be electrically connected to upper coil layers formed on the core layer through contact parts.

For example, the solenoid-type coil layers are formed as described below. First, a lower coil layer made of Cu is formed below a core layer (for example, a lower core layer), and an insulating layer is formed so as to fill the lower coil layer and spaces between pitches of the lower coils, The upper portion of the insulating layer is planarized. The insulating layer is removed from the upper surface of the lower coil layer, and contact parts made of a conductive material are formed by plating in the portions where the insulating layer is removed. Frames are formed on both sides of the contact parts by using a photolithography technique, and each upper coil layer is formed by plating in the spaces between the frames.

After the formation of the upper coil layers, the frames are removed, and the insulating layer is formed so as to fill the lower coils layer and spaces between pitches of the lower coils. The length of wiring lines between each lower coil layer and each upper coil layer is preferably as short as possible to suppress the electric resistance of the interlayer connection, and the contact parts are formed to be adjacent to each other.

The above-mentioned structure has been disclosed in JP-A-2002-150509 (US Publication No. 2004054460A1) and JP-A-2004-296062 (US Publication No. 2004100728A1).

According to a manufacturing method in the related art, the surface of the contact part 30 formed by plating is formed in a convex shape, as shown in FIG. 10A. As shown in FIG. 10B, when the frames are formed in a S photolithography process, light is incident on the convex surface of each contact part and then irregularly reflected from the convex surface during the exposure. The frames 140 are partially cut near the convex surface since the light is irregularly reflected toward the outside. For example, the frames become thin. As a result, an upper coil layer formed in regions surrounded by the frames 140 widens at the portion thereof that comes in contact with the contact part, and the dimension of each frame is deviated from an original design dimension. For example, the pitches of the upper coil layers are varied, and there is a possibility that a short circuit occurs between the coils. In the related art it is not possible to make the thickness of the frame any smaller than a predetermined value and the distance between the adjacent contact parts any smaller, in order to avoid the short circuit.

SUMMARY

The present embodiments may obviate one or more of the limitations of the related art. For example, in one embodiment, a thin film magnetic head is formed with high accuracy and the electric resistance is reduced in an interlayer connection part.

Generally, as shown in the related art, the size of an upper metal layer formed in a photolithography process is varied due to the fact that an interlayer connection surface between a lower metal layer and the upper metal layer is formed in a convex shape. Accordingly, when the interlayer connection surface is formed in a concave shape, the light is irregularly reflected toward the inside (a space between the frames).

In one embodiment, a thin film magnetic head has a thin film laminated structure, and includes a metal lamination part in which an upper metal layer is laminated on a lower metal layer. The metal lamination part is formed in the laminated structure, and an interlayer connection surface between the lower metal layer and the upper metal layer of the metal lamination part is formed in a concave shape that is curved toward the lower metal layer.

In one embodiment, the concave shape has a constant cross section in a direction perpendicular to a longitudinal direction of the lower metal layer and the upper metal layer.

In one embodiment, the upper metal layer is laminated on the lower metal layer with a contact part interposed therebetween. A surface, which comes in contact with the upper metal layer, of the contact part is formed in a concave shape.

In one embodiment, the upper metal layer is directly laminated on the lower metal layer. An upper surface of the lower metal later is formed in a concave shape.

In another embodiment, a thin film magnetic head has a thin film laminated structure including a metal lamination part in which an upper metal layer is laminated on a lower metal layer. A method of manufacturing the thin film magnetic head includes planarizing an upper surface of the lower metal layer, forming a contact part made of a conductive material on the planarized surface of the lower metal layer, performing a concave surface machining on the upper surface of the contact part, and forming the upper metal layer on the concave surface of the contact part by using a frame plating method.

In one embodiment, a thin film magnetic head has a thin film laminated structure including a metal lamination part in which an upper metal layer is laminated on a lower metal layer. A method of manufacturing the thin film magnetic head includes performing a concave surface machining on an upper surface of the lower metal layer, and forming the upper metal layer on the concave surface of the lower metal layer by using a frame plating method.

A concave shape that has a constant cross section in a direction perpendicular to a longitudinal direction of the lower metal layer may be formed through the concave surface machining. In one embodiment, the concave surface machining is performed by milling or CMP using acidic slurry.

In one embodiment, an interlayer connection surface between the lower metal layer and the upper metal layer of the metal lamination part is formed in a concave shape that is curved toward the lower metal layer. In this embodiment, it is possible to obtain a thin film magnetic head in which an upper metal layer can be formed on a lower metal layer with high accuracy and the electric resistance is reduced in an interlayer connection part.

DETAILED DESCRIPTION

Figure 1:
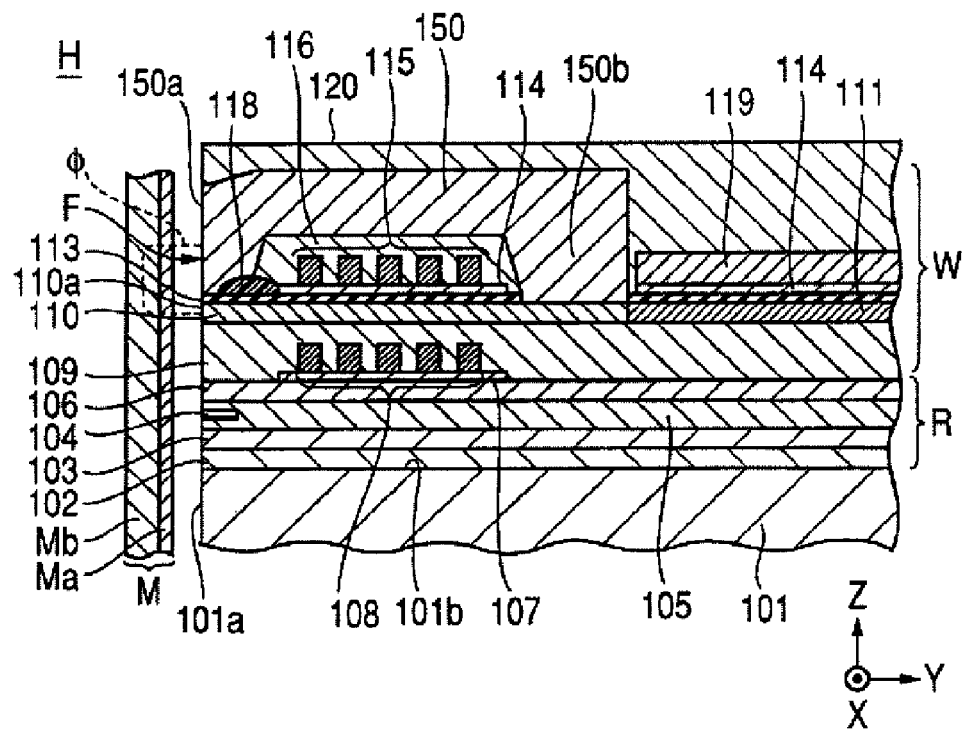
FIG. 1 is a longitudinal cross-sectional view of one embodiment of a thin film magnetic head, which includes interlayer connection parts of solenoid-shaped coils.

FIG. 1 is a longitudinal cross-sectional view partially showing a laminated structure of a thin film magnetic head according to one embodiment. In FIG. 1, an X-direction is defined as a track-width direction, a Y-direction is defined as a depth direction (height direction), and a Z-direction is defined as a direction in which various layers forming the thin film magnetic head are laminated.

In one embodiment, as shown in FIG. 1, The magnetic head H includes a reproducing element section R and a recording element section W that are formed on a trailing end surface 101b of a slider 101 by laminating thin films. The magnetic head applies a perpendicular magnetic field Φ to a recording medium M so as to magnetize a hard film Ma of the recording medium M in a perpendicular direction, thereby performing a recording operation.

The recording medium M includes a hard film Ma with high residual magnetization on the surface thereof and a soft film Mb with high magnetic permeability on the inner side of the hard film Ma. The recording medium M is formed, for example, in a disk shape, and rotates about the center of disk. The slider 101 is formed of non-magnetic materials, for example, $Al_2O_3 \cdot TiC$, and a surface 101a of the slider 101 faces the recording medium M. When the recording medium M rotates, the slider 101 floats above a surface of the recording medium M by airflow generated on the surface of the recording medium M. Alternatively, the slider 101 slides on the recording medium M.

A non-magnetic insulating layer 102 made of an inorganic material, for example, $Al_2O_3$ or $SiO_2$, is formed on the trailing end surface 101b of the slider 101, and the reproducing element section R is formed on the non-magnetic insulating layer 102.

The reproducing element section R includes a lower shield layer 103, an upper shield layer 106, an inorganic insulating layer (gap layer) 105 interposed between the lower shield layer 103 and the upper shield layer 106, and a reproducing element 104 provided in the inorganic insulating layer 105. The reproducing element 104 is a magnetoresistive effect element, for example, AMR, a GMR, or a TMR.

A plurality of lower coils 108 made of a conductive material are formed on the upper shield layer 106 with a coil insulating foundation layer 107 interposed therebetween. Each of the lower coils 108 is formed of one or more non-magnetic metal materials selected from a group comprising of, for example, Au, Ag, Pt, Cu, Cr, Al, Ti, NiP, Mo, Pd, or Rh. Alternatively, each of the lower coils 108 may have a laminated structure in which the above-mentioned non-magnetic metal materials are laminated. A coil insulating layer 109, which is formed of an inorganic insulating material, for example, $Al_2O_3$ or an organic insulating material such as a resist, is formed around the lower coils 108.

An upper surface of the coil insulating layer 109 is planarized, and a plating foundation layer (not shown) is formed on the planarized surface. A main magnetic pole layer (lower core layer) 110 is formed on the plating foundation layer through plating. The main magnetic pole layer 110 has a predetermined length L from a surface F, which faces the recording medium, of the perpendicular magnetic recording head (hereinafter, simply referred to as a "facing surface F") in the Y-direction (height direction).

A width of a front end surface 110a, which is exposed to the facing surface F, in the X-direction (track width direction) is defined as a track width. The main magnetic pole layer 110 is formed of, for example, a ferromagnetic material having a high saturation magnetic flux density, for example, Ni—Fe, Co—Fe, or Ni—Fe—Co.

A first insulating material layer 111 is formed on both sides of the main magnetic pole layer 110 in the X-direction and at the rear of the main magnetic pole layer in Y-direction. The first insulating material layer 111 can be formed of, for example, $Al_2O_3$, $SiO_2$, or Al—Si—O.

A gap layer 113 made of a non-magnetic inorganic insulating material, for example, alumina or $SiO_2$, is formed on the main magnetic pole layer 110 and the first insulating material layer 111. Upper coils 115 are formed on the gap layer 113 with a coil insulating foundation layer 114 interposed therebetween. Like the lower coils 108, a plurality of upper coils 115 is formed of a conductive material. Each of the upper coils 115 is formed of one or more non-magnetic metal materials selected from a group comprising of, for example, Au, Ag, Pt, Cu, Cr, Al, Ti, NiP, Mo, Pd, or Rh. Alternatively, each of the upper coils 115 may have a laminated structure in which the above-mentioned non-magnetic metal materials are laminated. The lower coils 108 and the upper coils 115 are electrically connected to each other at the ends thereof in the track width direction (X-direction in the drawings), respectively, so as to form a solenoid coil shape (see FIG. 2).

A coil insulating layer 116, which is made of an organic insulating material such as resist, is formed around the upper coils 115. A return path layer (upper core layer) 150 that is made of a ferromagnetic material such as Permalloy is formed on the coil insulating layer 116 and the gap layer 113. The return path layer 150 includes a front end surface 150a exposed to the facing surface F, and faces the main magnetic pole layer 110 with a gap G therebetween on the facing surface F. The rearmost end of the return path layer 150 in the height direction is a connecting portion 150b connected to the main magnetic pole layer 110.

A height determining layer 118 made of an inorganic or organic material is formed at a position, which is spaced from the facing surface F by a predetermined distance, on the gap layer 113. A throat height of the thin film magnetic head H is determined by a distance between the facing surface F and a front edge of the height determining layer 118. A coil lead layer 119 extending from the upper coils 115 is provided on the rear side of the return path layer 150 in the height direction, with the coil insulating foundation layer 114 provided between the coil lead layer 119 and the gap layer. The return path layer 150 and the coil lead layer 119 are covered with a protective layer 120 made of an inorganic non-magnetic insulating material or the like. Although not shown, a coil lead layer can be connected to the lower coils 108, the coil lead layer 119 can be connected to the upper coils 115, or an electrode pad layer can be connected to an electrode lead layer of the reproducing element 104 are formed on the protective layer 120.

In the thin film magnetic head H having thin film laminated structure, an interlayer connection is formed between the lower coils 108 and the upper coils 115. The interlayer connection between the lower coils 108 and the upper coils 115 will be described with reference to FIGS. 2 to 5.

Figure 2:
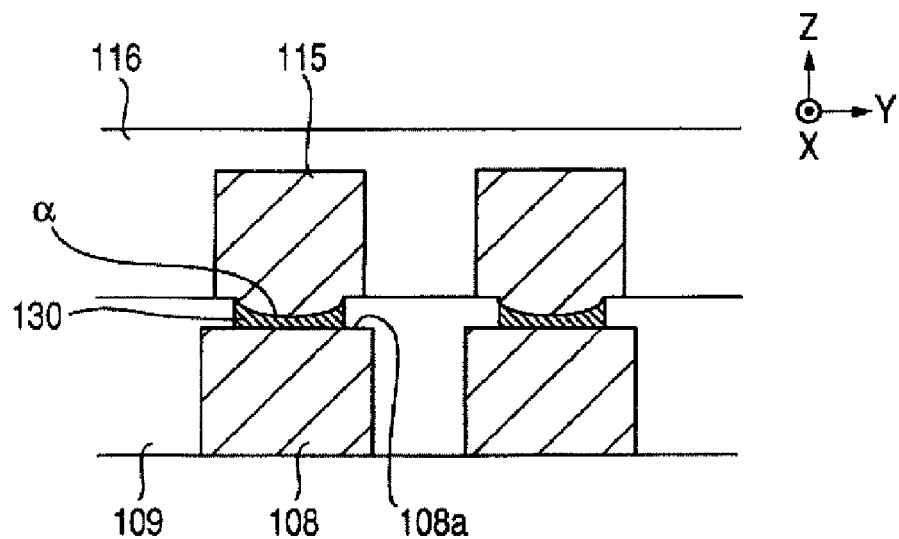
FIG. 2 is an enlarged cross-sectional view of one embodiment of the interlayer connection parts of the solenoid-shaped coils shown in FIG. 1.

FIG. 2 is an enlarged cross-sectional view schematically showing connection parts (end portion in the track width direction) between the lower coils 108 and the upper coils 115. In one embodiment, as shown in FIG. 2, the upper surface 108a of each lower coil 108 is planarized, and each lower coil 108 and each upper coil 115 are electrically connected to each other through a contact part 130 formed on the planarized surface 108a. The contact part 130 is formed of a non-magnetic metal material that has, for example, a higher milling rate and a higher CMP working rate than the material of the coil insulating layer 109 and has an excellent adhesion with materials of the lower coils 108 and the upper coils 115. The contact part 130 is formed of one or more non-magnetic metal materials selected from a group comprising of, for example, Au, Ag, Pt, Cu, Cr, Al, Ti, NiP, Mo, Pd, or Rh.

The upper surface (a surface connected to the upper coil 115) α of each contact part serving as an interlayer connection surface between each lower coil 108 and each upper coil 115 is curved toward the lower coil 108 to form a concave surface. The concave surface forms a constant cross section in a direction perpendicular to an extension direction (longitudinal direction) of the lower coil 108 and the upper coil 115. When the lower coil 108 and the upper coil 115 are connected to each other with the concave surface, the contact area between the lower coil 108 and the upper coil 115 is further increased as compared to when the interlayer connection surface (the upper surface of each contact part 130) between both coils is a planarized surface. In this embodiment, it is possible to reduce the contact electric resistance between the coils. The contact part 130 interposed between the lower coil 108 and the upper coil 115 is decreased as compared to when the interlayer connection surface between both coils is a planarized surface. Accordingly, it is possible to suppress the increase in electric resistance of the interlayer connection part caused by the contact part 130.

Figure 3:
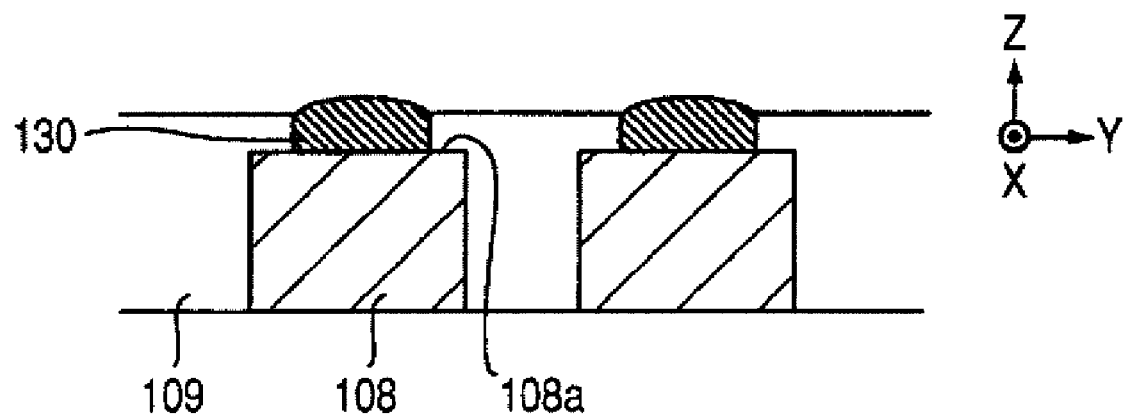
FIG. 3 is a cross-sectional view of one embodiment of a method of performing an interlayer connection of the solenoid-shaped coils.
Figure 4:
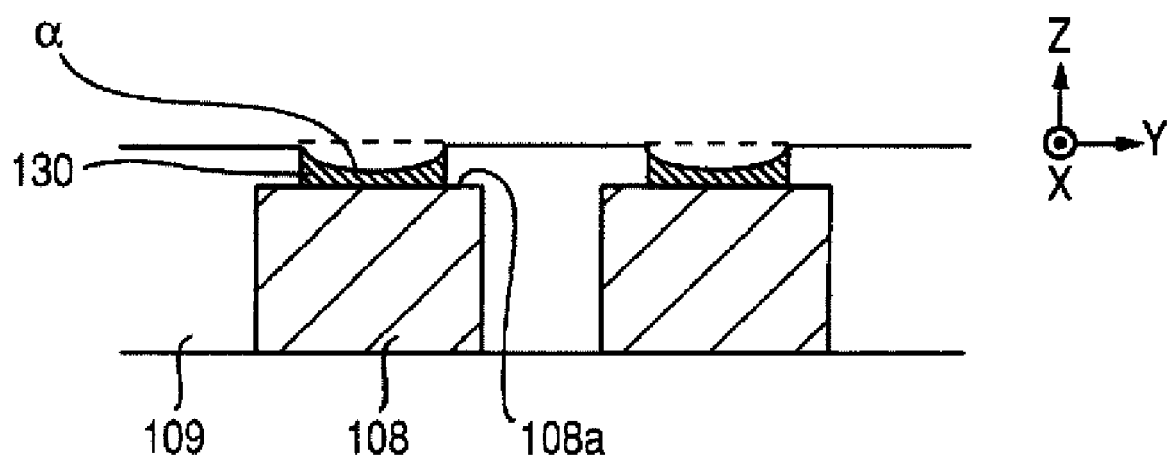
FIG. 4 is a cross-sectional view of one embodiment of a method of performing an interlayer connection of the solenoid-shaped coils.
Figure 5:
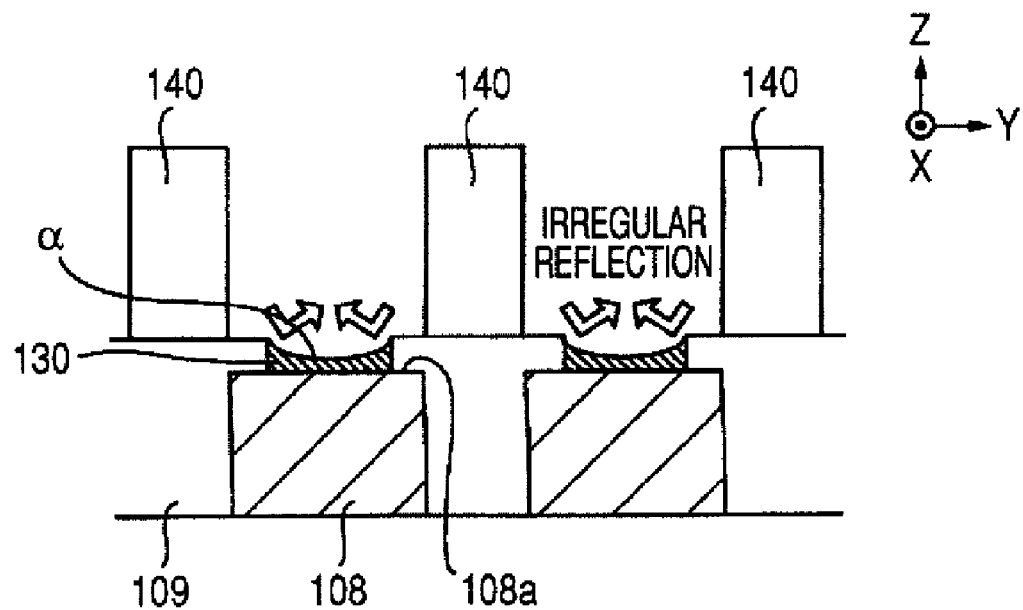
FIG. 5 is a cross-sectional view of one embodiment of a method of performing an interlayer connection of the solenoid-shaped coils.

The interlayer connection between the lower coil 108 and the upper coil 115 is performed as described below. FIGS. 3 to 5 are cross-sectional views illustrating processes for performing the interlayer connection between the lower coils 108 and the upper coils 115.

In one embodiment, the lower coils 108 are formed on the coil insulating foundation layer 107 through plating, and the upper surfaces of the lower coils are planarized. The coil insulating layer 109 is formed so as to fill the lower coils 108 and spaces between pitches of the lower coils 108.

As shown in FIG. 3, a part of the coil insulating layer 109 is removed to form openings 109a through which the upper surfaces (planarized surfaces) of the lower coils 108 are exposed to the outside, and a contact part 130 is formed in each of the opening 109a. A plating foundation film is formed on the lower coil 108 exposed through the opening 109a to the outside, and the contact part 130 is formed on the plating foundation film by plating. The contact part 130 is formed of a non-magnetic metal material that has a higher milling rate and a higher CMP working rate than the material of the coil insulating layer 109 and has an excellent adhesion property to materials of the lower coil 108 and the upper coil 115. The contact part 130 immediately after the plating forms a convex surface protruding upward as exactly shown in FIG. 3.

The upper surface of each contact part 130 is machined to form a concave surface that is curved toward the lower coil 108 to form a concave surface. The concave surface machining may be performed by milling or CMP (Chemical Mechanical Polishing).

When the milling is used in the concave surface machining, a planarization process is performed so that the position of the upper surface of each contact part 130 coincides with the position of the upper surface of the coil insulating layer 109. The upper surface of each contact part 130 is machined through the milling so as to form a concave shape that has a constant cross section in a direction (see FIG. 4) perpendicular to an extension direction (longitudinal direction) of the lower coil 108.

In one embodiment, the contact part 130 is formed of a conductive material that has a higher milling rate than the material of the coil insulating layer 109. Accordingly, when the milling is performed, the contact part 130 is more cut than the coil insulating layer 109. The concave surface machining performed by milling may be performed together with the milling performed as a pre-process when the plating foundation film of the upper coil is formed.

When the CMP is used in the concave surface machining, grinding is performed using an acidic slurry. Even after the position of the upper surface of each contact part 130 coincides with the position of the upper surface of the coil insulating layer 109, the grinding is continuously performed.

In one embodiment, the contact part 130 is formed of a conductive material that has a higher milling rate and a higher CMP working rate than the material of the coil insulating layer 109. Accordingly, if the CMP is continuously performed even after the position of the upper surface of each contact part 130 coincides with the position of the upper surface of the coil insulating layer 109, the contact part 130 is more cut than the coil insulating layer 109. As a result, the upper surface of each contact part 130 is curved toward the lower coil 108 so as to be formed in a concave shape that has a constant cross section in the direction perpendicular to the S extension direction of the lower coil 108.

As shown in FIG. 4, the upper surface of each contact part 130 is changed into an interlayer connection surface a formed in a concave shape by milling or CMP.

When the interlayer connection surface α is formed, frames 140 used to form regions forming the upper coils are formed using a photolithography technique as shown in FIG.

5. For example, in a photolithography process, a photoresistor is formed on both the entire surface of the coil insulating layer 109 and the contact parts 130, and then exposed to light so as to be developed. During the exposure, light is incident on the upper surface α of each contact part 130 and then irregularly reflected from the upper surface of each contact part 130. However, since the upper surface α of each contact part 130 is formed in the concave shape, the light is irregularly reflected toward a space between the adjacent frames 140 as shown in FIG. 5. Accordingly, the light that is incident on each contact part 130 and then irregularly reflected from the upper surface of each contact part 130 does not make the frames 140 excessively thin, thereby obtaining the frames 140 that have original design dimensions and shapes.

In one embodiment, a plating foundation film is formed on the upper surface α of each contact part 130 that is exposed to the outside through the frames 140. The upper coils 115 are formed on the plating foundation film by plating. As a result, the upper coils 115 shown in FIG. 2 are obtained, and the upper coils 115 are electrically connected to the lower coils 108 through the contact parts 130 that are formed in the concave shape.

In one embodiment, the upper surface α of each contact part 130 is formed in the concave shape. As a result, when exposure is performed in a photolithography process (when the frames are formed), the light is irregularly reflected toward the space between the adjacent frames 140. For this reason, the frames 140 do not become excessively thin due to the irregular reflection of light. Accordingly, it is possible to form the frames 140 with high accuracy. As a result, it is possible to form the upper coils 115 with a regular pitch and high accuracy, thereby avoiding a short circuit between the upper coils 115. The frames 140 become thin and the lower coils 108 and the upper coils 115 become thick. As a result, it is possible to reduce the electric resistance between the coils.

In one embodiment, the contact area between the lower coil 108 and the upper coil 115 is increased as compared to when the upper surface α of each contact part 130 is a planarized surface. In this embodiment, it is possible to reduce the contact electric resistance between both coils 108 and 115, thereby reducing the electric resistance of the interlayer connection part.

In one embodiment, the contact part 130 interposed between the lower coil 108 and the upper coil 115 is decreased as compared to when the upper surface α of each contact part 130 is a planarized surface. In this embodiment, it is possible to reduce the electric resistance of the interlayer connection part.

Figure 6:
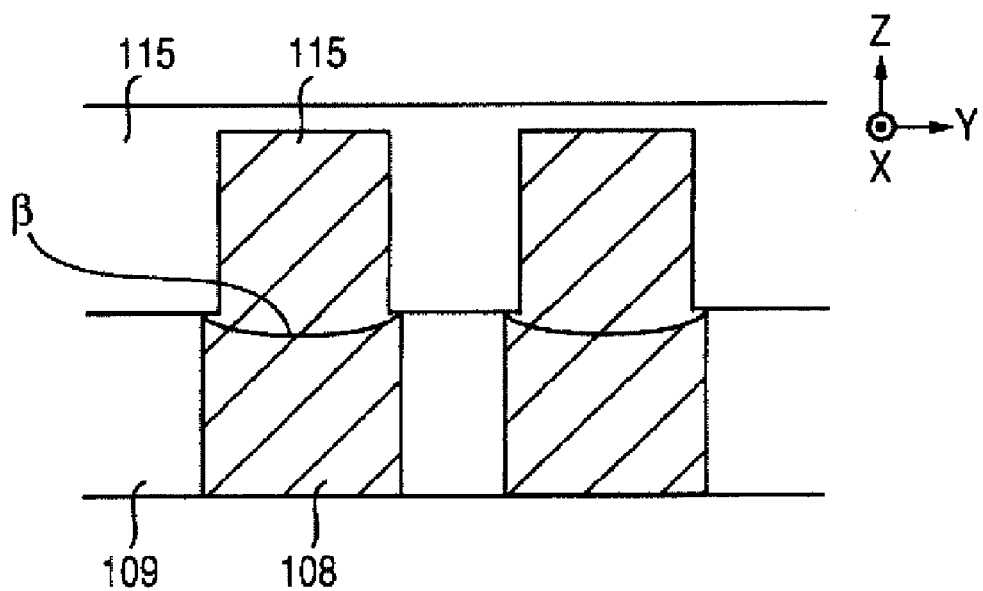
FIG. 6 is an enlarged cross-sectional view of one embodiment of the interlayer connection parts of solenoid-shaped coils.
Figure 7:
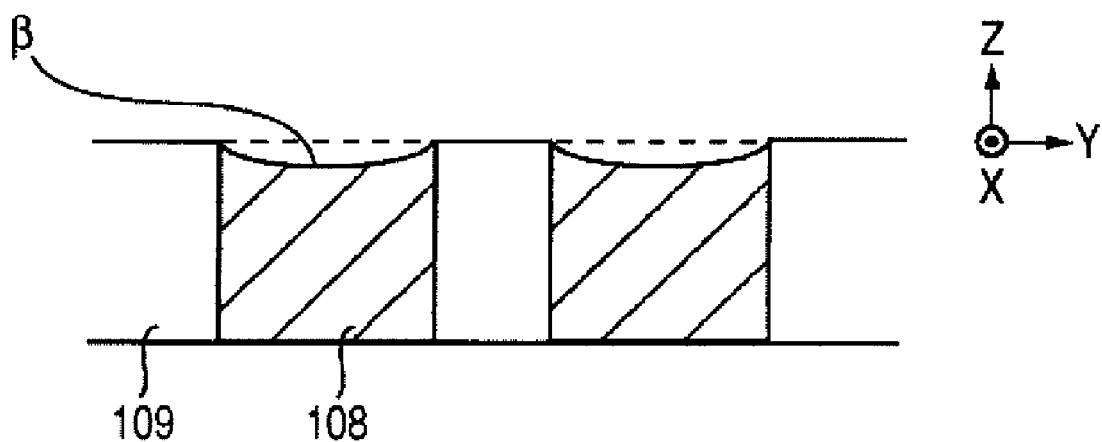
FIG. 7 is a cross-sectional view of one embodiment of a method of performing an interlayer connection of the solenoid-shaped coils.
Figure 8:
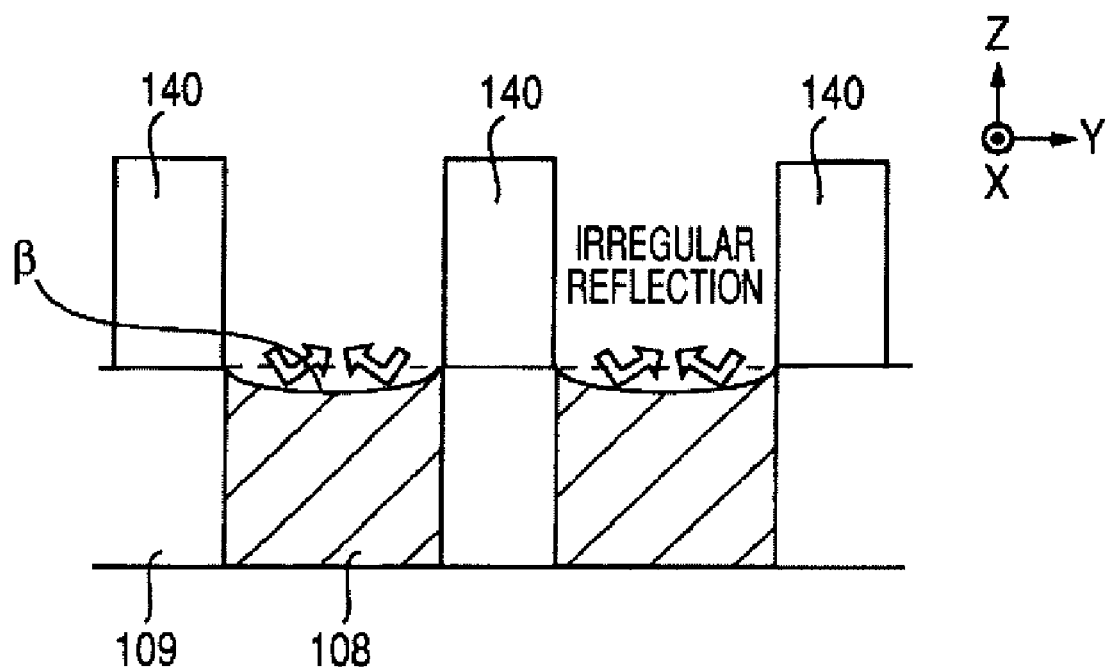
FIG. 8 is a cross-sectional view of one embodiment of a method of performing an interlayer connection of the solenoid-shaped coils.

In another embodiment, as shown in FIGS. 6 to 8, a lower coil 108 and an upper coil 115 are directly connected to each other without the contact part 130 of the first embodiment interposed therebetween. For example, one embodiment shown in FIGS. 6 to 8 may has substantially the same configuration as one embodiment shown in FIGS. 6 to 8, with the exception of the interlayer connection. Accordingly, the elements in FIGS. 6 to 8 that are substantially the same as those elements shown in FIG. 1 will have the same reference numeral.

FIG. 6 is an enlarged cross-sectional view schematically showing connection parts (end portion in the track width direction) between the lower coils 108 and the upper coils 115.

In one embodiment, as shown in FIG. 6, the upper surface β of each lower coil 108 is formed in a concave shape, and each upper coil 115 is directly formed on the concave surface. The concave shape of the lower coil 108 has a constant cross section in the direction perpendicular to the extension direction (longitudinal direction) of the lower coil 108 and the upper coil 115.

In one embodiment, when the lower coil 108 and the upper coil 115 are directly connected to each other with the concave surface, the contact area between the lower coil 108 and the upper coil 115 is further increased as compared to when the interlayer connection surface (the upper surface β of each lower coil 108) between both coils is a planarized surface. In this embodiment, it is possible to reduce the contact electric resistance between the lower coil 108 and the upper coil 115, thereby reducing the contact electric resistance between both coils.

The interlayer connection between the lower coil 108 and the upper coil 115 is performed as described below. FIGS. 7 and 8 are cross-sectional views that illustrate processes for performing the interlayer connection between the lower coils 108 and the upper coils 115.

In one embodiment, the lower coils 108 are formed on a coil insulating foundation layer 107 by plating, and a coil insulating layer 109 is formed so as to fill the lower coils 108 and spaces between pitches of the lower coils 108. Each of the lower coils 108 is formed of one or more non-magnetic metal materials selected from a group comprising of, for example, Au, Ag, Pt, Cu, Cr, Al, Ti, NiP, Mo, Pd, or Rh. The material of each lower coil 108 has a higher milling rate and a higher CMP working rate than the material (insulating material) of the coil insulating layer.

The upper surface of each lower coil 108 is machined to form a concave surface. The concave surface machining may be performed by milling or CMP (Chemical Mechanical Polishing), which is similar to one embodiment shown in FIG. 2.

When the milling is used in the concave surface machining, the upper surface of each lower coil 108 is planarized. The upper surface of each lower coil 108 is machined by milling so as to form a concave shape that has a constant cross section in a direction (see FIG. 7) perpendicular to an extension direction (longitudinal direction) of the lower coil 108.

The lower coil 108 is formed of a non-magnetic metal material that has a higher milling rate than the material of the coil insulating layer 109. Accordingly, the lower coil 108 is more cut than the coil insulating layer 109. The concave surface machining performed by milling may be performed together with the milling performed as a pre-process when the plating foundation film of the upper coil is formed.

In one embodiment, when the CMP is used in the concave surface machining, grinding is performed using an acidic slurry. Even after the position of the upper surface of each lower coil 108 coincides with the position of the upper surface of the coil insulating layer 109, the grinding is continuously performed. Accordingly, if the CMP working rate of the material of the lower coil 108 is higher than that of the material of the coil insulating layer 109 and the CMP is continuously performed even after the position of the upper surface of each contact part 130 coincides with the position of the upper surface of the coil insulating layer 109, the lower coil 108 is more cut than the coil insulating layer 109. As a result, the upper surface of each lower coil 108 is curved toward the lower coil 108 so as to be formed in a concave shape that has a constant cross section in the direction perpendicular to the extension direction of the lower coil 108.

As shown in FIG. 7, the upper surface of each lower coil 108 is changed into an interlayer connection surface β formed in a concave shape by milling or the CMP.

In one embodiment, when the interlayer connection surface β is formed, frames 140 used to form regions forming the upper coils are formed using a photolithography technique as shown in FIG. 8. For example, in a photolithography process, a photoresistor is formed on the entire surfaces of the coil insulating layer 109 and the lower coils 108, and then exposed to light so as to be developed. During the exposure, light is incident on the upper surface β of each lower coil 108 and then irregularly reflected from the upper surface of each lower coil 108.

In one embodiment, as described above, since the upper surface β of each lower coil 108 is formed in the concave shape, the light is irregularly reflected toward a space between the adjacent frames 140 as shown in FIG. 8. For this reason, the light that is incident on each lower coil 108 and then irregularly reflected from the upper surface of each lower coil 108 does not make the frames 140 excessively thin, thereby obtaining the frames 140 having original design dimensions and shapes.

A plating foundation film is formed on the upper surface β of each lower coil 108 that is exposed to the outside through the frames 140, and the upper coils 115 are formed on the plating foundation film by plating. As a result, the upper coils 115 shown in FIG. 6 are obtained, and the upper coils 115 are connected to the lower coils 108 through the upper surfaces β of the lower coils 108 that are formed in the concave shape.

In one embodiment, when exposure is performed in a photolithography process (when the frames are formed), the light is irregularly reflected toward the space between the adjacent frames 140. For this reason, the frames 140 do not become excessively thin by the irregular reflection of light. Accordingly, it is possible to form the frames 140 with high accuracy. In this embodiment, it is possible to form the upper coils 115 with a regular pitch and with high accuracy, thereby avoiding a short circuit between the upper coils 115. For this reason, the frames 140 become thin and the lower coils 108 and the upper coils 115 become thick. Accordingly, it is possible to reduce the electric resistance between the coils.

Figure 9:
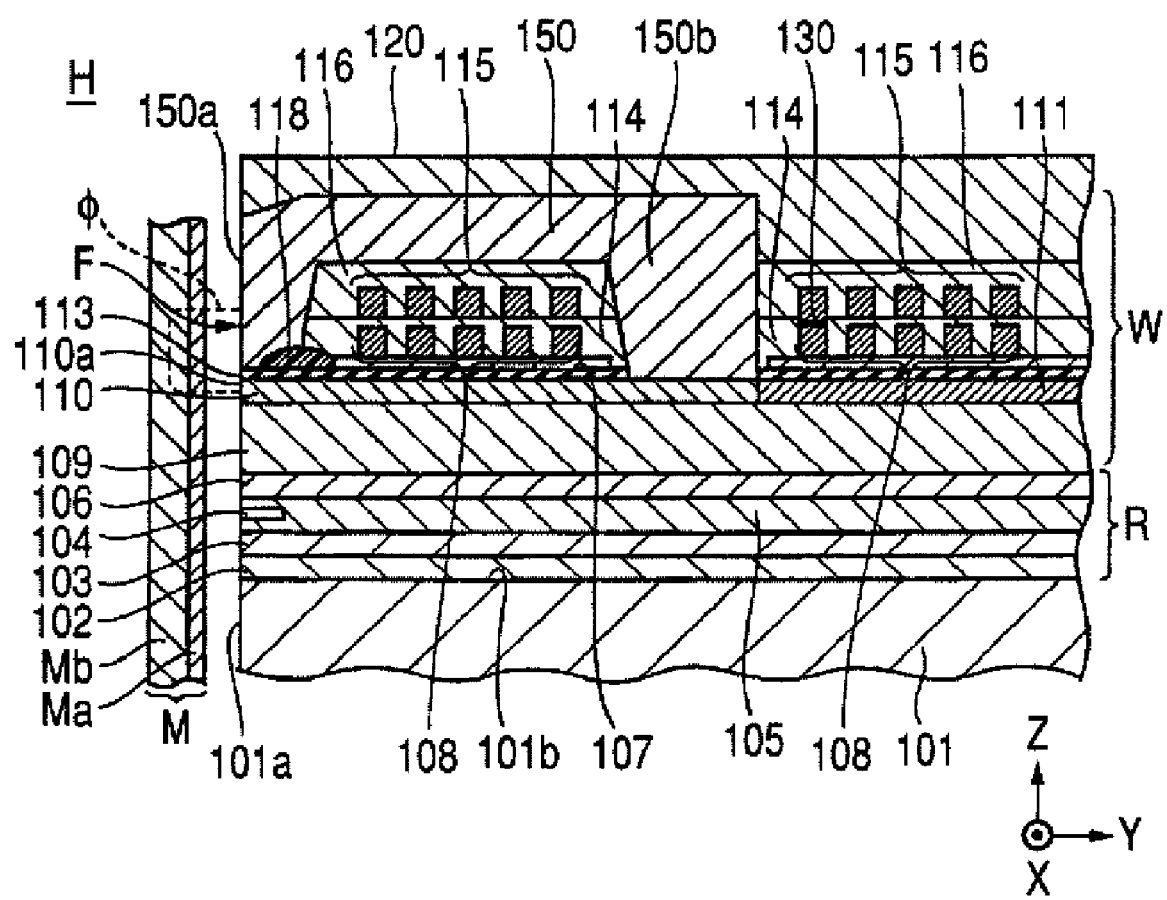
FIG. 9 is a longitudinal cross-sectional view of one embodiment of a laminated structure of a thin film magnetic head including spiral coil layers.
Figure 10A:
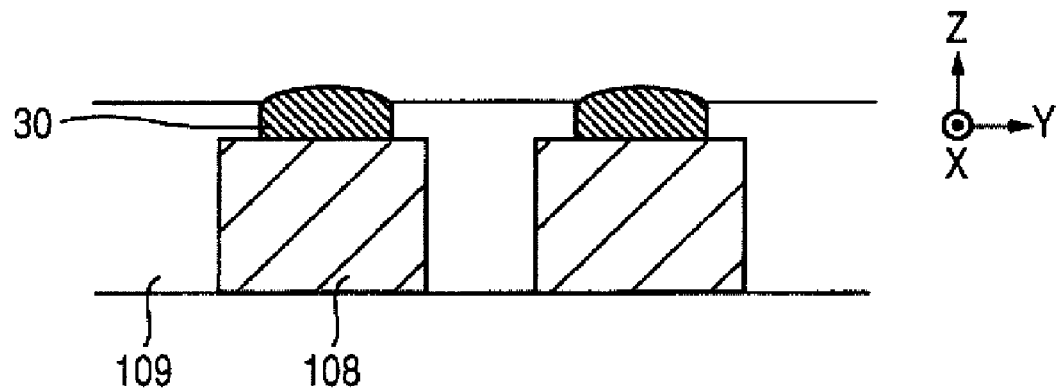
FIG. 10 is a cross-sectional view illustrating a method of performing an interlayer connection in the related art.
Figure 10B:
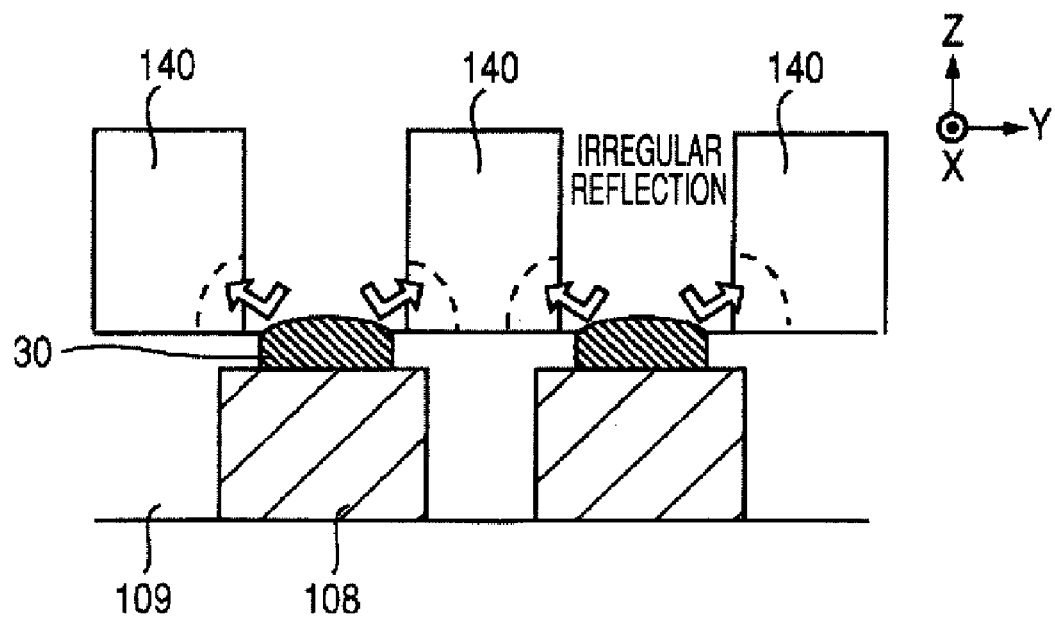

The exemplary embodiments shown above have been described using an interlayer connection between solenoid-shaped coil layers included in the perpendicular magnetic head. However, in one embodiment, as shown in FIG. 9, a spiral coil layer, which is wound around a connection part 150b of a return path layer 150 may be formed to have a two-layer structure, and the exemplary embodiments may also be applied to the interlayer connection for connecting lower coils 108 with upper coils 115.

Alternatively, one exemplary embodiment may include another suitable interlayer connection, for example, a wiring connection between an electrode lead layer of a reproducing element 104 and an electrode pad, or a wiring connection between a coil lead layer and an electrode pad, in addition to the interlayer connection between coil layers. The exemplary embodiments are not limited to the perpendicular magnetic head, and may also be applied to a thin film magnetic head for longitudinal recording.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A thin film magnetic head having a thin film laminated structure, comprising:
   a metal lamination part in which an upper metal layer is laminated on a lower metal layer, the metal lamination part being formed in the laminated structure,
   wherein an interlayer connection surface between the lower metal layer and the upper metal layer of the metal lamination part is formed in a concave shape that is curved toward the lower metal layer, and
   wherein the upper metal layer and the lower metal layer are electrically connected to each other through the interlayer connection surface.

2. The thin film magnetic head according to claim 1, wherein the concave shape has a constant cross section in a direction perpendicular to a longitudinal direction of the lower metal layer and the upper metal layer.

3. The thin film magnetic head according to claim 1, wherein the upper metal layer is laminated on the lower metal layer with a contact part interposed therebetween, wherein the contact part is formed of a conductive material, and
   a surface of the contact part, which comes in contact with the upper metal layer, is formed in a concave shape.

4. The thin film magnetic head according to claim 1, wherein the upper metal layer is directly laminated on the lower metal layer, and an upper surface of the lower metal layer is formed in a concave shape.

5. A thin film magnetic head comprising: a upper coil; a lower coil; and
   a connection part between the upper coil and the lower coil, wherein the lower coil and the upper coil are electrically connected to each other through the connection part, and
   wherein an upper surface of the connection part is curved toward the lower coil to form a concave surface.

6. The thin film magnetic head according to claim 5, wherein an upper surface of the lower coil is planarized, and wherein the lower coil and the upper coil are electrically connected to each other through the connection part formed on the upper surface.

7. The thin film magnetic head according to claim 6, wherein the connection part is formed of one or more non-magnetic metal materials.

8. The thin film magnetic head according to claim 7, wherein the connection part is formed of one or more of Au, Ag, Pt, Cu, Cr, Al, Ti, NiP, Mo, Pd, or Rh.

* * * * *